Jan. 19, 1971

L. H. LEONARD, JR  3,555,839

VARIABLE VAPOR PRESSURE ABSORPTION REFRIGERATION SYSTEMS

Filed Dec. 18, 1968

INVENTOR.
LOUIS H. LEONARD, JR.
BY *Frank N. Decker Jr.*

ATTORNEY.

United States Patent Office 3,555,839
Patented Jan. 19, 1971

3,555,839
VARIABLE VAPOR PRESSURE ABSORPTION REFRIGERATION SYSTEMS
Louis H. Leonard, Jr., De Witt, N.Y., assignor to Carrier Corporation, Syracuse, N.Y., a corporation of Delaware
Filed Dec. 18, 1968, Ser. No. 784,725
Int. Cl. F25b 15/06
U.S. Cl. 62—101
16 Claims

ABSTRACT OF THE DISCLOSURE

A heating and cooling system employing a two-stage adiabatic evaporator and a two-stage absorber having a counter-flow relationship with the evaporator. A vapor pressure control passage is provided which dilutes the refrigerant passing to the evaporator with absorbent solution to lower the vapor pressure of the refrigerant upon a drop in ambient absorber temperature. The vapor pressure control passage also passes diluted refrigerant to a weak solution passage where it mixes with weak solution to the generator, resulting in an increase in the concentration and vapor pressure of the refrigerant in the evaporator upon a rise in ambient absorber temperature. Heating passage means is provided to mix absorbent solution and refrigerant, which is heated in a generator to supply heating at a desired location.

CROSS REFERENCE TO RELATED APPLICATION

This application discloses a heating cycle which is the subject of my co-pending application Ser. No. 784,724 filed concurrently herewith.

BACKGROUND OF THE INVENTION

Absorption refrigeration systems employing an aqueous solution of a lithium halide, such as lithium bromide, as an absorbent, and water as a refrigerant, have achieved considerable commercial success. Lithium bromide is a non-toxic, inexpensive salt which in a concentrated aqueous solution has a strong affinity for water vapor. Water is a non-toxic inexpensive refrigerant having a high heat of vaporization which is easy to separate from lithium bromide solution, at moderate temperature and pressure in a generator.

Prior lithium bromide-water absorption refrigeration systems have been largely restricted to applications having a water-cooled absorber. These systems necessitated utilizing cooling water to maintain the absorber temperature sufficiently low to provide a low enough evaporator temperature for air conditioning applications. However, it has been necessary to provide means to prevent the cooling water and the absorber temperature from going too low because of the danger of solidifying the absorbent solution. If the solution in the absorber solidifies, the system is rendered temporarily inoperative and it may require considerable attention to desolidify it. Even when the absorber temperature does not drop to a point sufficient to solidify the absorber, the cold solution being returned to the generator from the absorber may cause the strong solution passing to the absorber to solidify in the solution heat exchanger, thus requiring it to be desolidified by the application of external heat or other means. Furthermore, if the absorber temperature is allowed to drop too low, the decreased absorbent vapor pressure may cause the refrigerant water in the evaporator to freeze. When this happens, solid ice may form in the evaporator and prevent refrigerant circulation to the refrigeration load. Also, the evaporator pump may be damaged either by ice formation or by a lack of lubricant water supplied to its bearings.

To obviate these problems, it is generally necessary to control the minimum cooling water temperature supplied to the system from the cooling tower. The cooling tower is provided with a cooling tower bypass valve and bypass control system so that the cooling water is bypassed around the cooling tower when necessary, to prevent the temperature of the cooling water supplied to the absorber from dropping excessively.

Since this arrangement requires an expensive valve and associated control system, it is obviously desirable to eliminate the need for controlled cooling water temperature, if possible. It is also well known that the elimination of the minimum cooling water temperature requirement would result in improved system efficiency at low ambient conditions by allowing the absorption refrigeration system to reject its heat at a lower temperature. It also has been recognized that there would be a substantial advantage in providing an air-cooled absorber and evaporator in a lithium bromide-water absorption refrigeration system which could be located out of doors. However, the problems described above are greatly increased in air-cooled systems because of the possibility of a sudden drop in ambient temperature.

It is a principal feature of this invention to provide an absorption refrigeration system of a type which may use a lithium halide salt solution as an absorbent and water as a refrigerant which may operate with either an air-cooled absorber and condenser or with uncontrolled cooling water temperatures.

SUMMARY OF THE INVENTION

In accordance with this invention, there is provided an absorption refrigeration system having an absorber, an evaporator, a generator and a condenser connected to provide refrigeration. A vapor pressure control passage is provided which serves to dilute the refrigerant in the evaporator with absorbent solution to lower the vapor pressure and raise the evaporation temperature of the refrigerant when the ambient absorber temperature drops. Conversely, the vapor pressure control passage serves to pass diluted refrigerant from the evaporator to the generator for separation of refrigerant from absorbent to raise the vapor pressure and lower the evaporation temperature of the refrigerant in the evaporator when the ambient absorber temperature rises toward the design condition. The vapor pressure control passage effectively adjusts the vapor pressure of refrigerant in the evaporator relative to the vapor pressure in the absorber, when the system is operating at ambient temperatures below the design temperature, so as to provide a relatively constant evaporation temperature regardless of absorber temperature and vapor pressure.

By adjusting the vapor pressure of the refrigerant in accordance with this invention, it is not necessary to have a controlled absorber temperature and it is possible to operate the system with an air-cooled absorber and condenser, without danger of solidification of absorbent or freezing of refrigerant. The system may be located in a low ambient temperature region without danger of freezing because the freezing point of both the refrigerant and the absorbent is significantly reduced. A system according to this invention will operate at a higher efficiency as the ambient absorber temperature drops, because the heat from the system is rejected at a lower temperature. In addition, the heat of dilution, which represents a thermodynamic loss, is reduced when the absorber temperature is reduced. The refrigerant condensate is cooled to a lower temperature which further increases the cycle efficiency by reducing the superheat of refrigerant introduced into the evaporator.

DESCRIPTION OF THE PREFERRED EMBODIMENT

Figure 1:
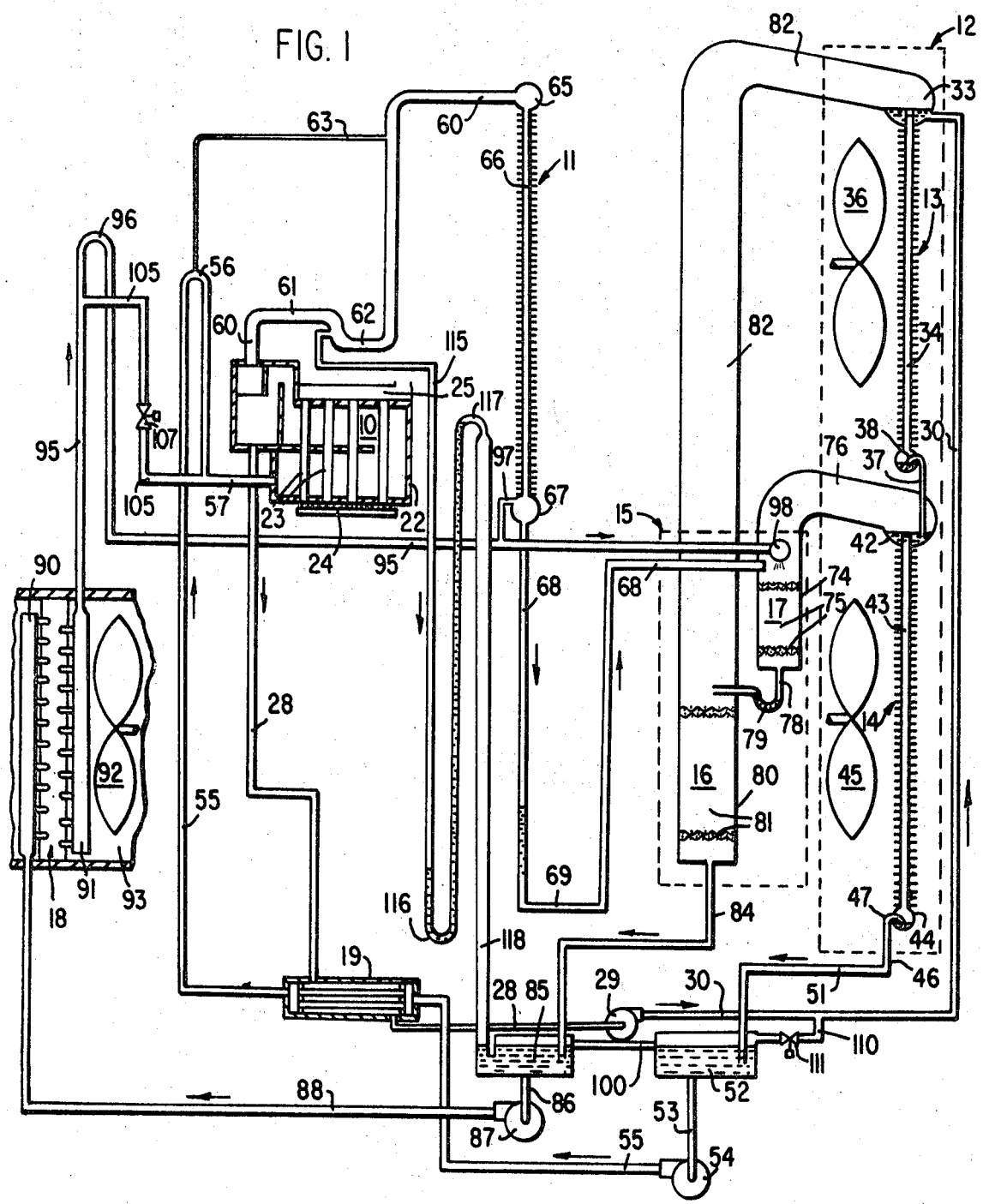
FIG. 1 is a schematic flow diagram, partially in cross section, of a heating and cooling system embodying a variable vapor pressure arrangement in accordance with this invention showing certain liquid levels in the cooling mode of operation.

This invention will be described with respect to a preferred embodiment wherein a two-stage adiabatic refrigerant evaporator and a two-stage air-cooled absorber are employed in the cooling mode of operation. However, this invention may be employed in systems having any number of either adiabatic or nonadiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide which is strong in absorbing power will be referred to as "strong" solution and a dilute solution of lithium bromide which is weak in absorbing power will be referred to as "weak" solution. Likewise, pure water will be referred to as "concentrated refrigerant" and refrigerant water having lithium bromide therein will be referred to as "dilute refrigerant." A heat transfer promoting additive, such as 2-ethyl-n-hexanol, may be added to the absorbent solution.

Referring to the drawings, the system comprises a generator 10, a condenser 11, an absorber 12 having a low pressure stage 13 and a high pressure stage 14, an adiabatic evaporator 15 having a low temperature stage 16 and a high temperature stage 17, an air conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger. Heat exchanger 18 is illustrative of the preferred remote type of heat exchanger which is suitable for the adiabatic evaporator system illustrated. If a non-adiabatic conventional evaporator is employed, heat exchanger 18 may be located in the evaporator.

Generator 10 comprises a shell 22 having a plurality of fire tubes 23 extending therethrough. A suitable heat source, such as a fuel burner 24, discharges hot gas through fire tubes 23. Flue gas collector 25 is arranged above the fire tubes and is connected to an exhaust flue. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low pressure vapor header 33 disposed at the top of low pressure absorber stage 13.

Low pressure absorber stage 13 comprises a plurality of vertically disposed finned absorber heat exchange tubes 34 connected at their upper ends by a low pressure vapor header 33 and at their lower ends by a low pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low pressure liquid header 35 is of intermediate concentration. The intermediate solution passes through siphon tube 37 having an upwardly arched portion 38 into high pressure vapor header 42 of high pressure absorber stage 14.

High pressure absorber stage 14 comprises a plurality of finned vertical absorber heat exchange tubes 43 joined at their upper ends by high pressure vapor header 42 and at their lower ends by high pressure liquid header 44. Intermediate absorbent solution overflows the upper open ends of absorber tubes 43 and passes downwardly along the interior surfaces of the absorber tubes while refrigerant vapor is being absorbed therein. The heat of the absorption process is rejected from high temperature absorber stage 14 to ambient air passed over the exterior surfaces of absorber tubes 43 by fan 45.

Absorbent solution passing downwardly through absorber tubes 43 is further diluted by the absorption of refrigerant vapor therein so that the absorbent solution collected in high pressure liquid header 44 is weak in absorbing power. The weak solution passes from low pressure liquid header 44 through a siphon tube 46 having an upwardly arched portion 47 through weak solution passage 51 into weak solution sump 52. The weak solution then passes from weak solution sump 52 through weak solution passage 53 to weak solution pump 54. The weak solution is then pumped through weak solution passage 55 and the interior tubes of solution heat exchanger 19 through an upwardly extending loop 56, and weak solution passage 57 into generator 10 for reconcentration.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode. A vent line 63 vents the upper portion of loop 56 to the condenser pressure in passage 60.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensates formed in condenser 11 passes from header 67 through condensate passage 68 having a downwardly extending loop or trap 69 into high temperature evaporator stage 17 of adiabatic refrigerant evaporator 15.

High temperature evaporator stage 17 preferably comprises a shell 74 having a suitable packing material 75 to provide an extended mass and heat transfer surface. A vapor passage 76 extends between high temperature evaporator stage 17 and vapor header 42 of high pressure absorber stage 14. A small quantity of refrigerant is evaporated from refrigerant passing through evaporator stage 17, thereby flash-cooling the remaining refrigerant. The cooled refrigerant passes from high temperature evaporator stage 17 to low temperature evaporator stage 16 through refrigerant passage 78 having a downwardly extending trap 79.

Low temperature evaporator stage 16 preferably comprises a shell 80 having suitable packing material 81 therein and a refrigerant vapor passage 82 communicating with vapor header 33 of low pressure absorber 13. As in the preceding stage, a small quantity of refrigerant is evaporated in low temperature evaporator stage 16 which results in flash-cooling the remainder of refrigerant passing therethrough. In all, only about one percent of the total refrigerant flowing through adiabatic evaporator 15 need be evaporated to satisfactorily flash-cool the remaining ninety-nine percent. It is preferred to employ an adiabatic evaporator in which the refrigerant is flashcooled and no external heat is added; however, a conventional single or multi-stage evaporator having a heat absorbing heat exchanger therein may be employed, if desired.

The cold refrigerant then passes from low temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air conditioning fan-coil unit having an inlet header 90, an outlet header 91 and a fan 92 for passing air to be conditioned through the fan-coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passage 95 having an upwardly extending loop 96 and restricted spray nozzle 98 back to high temperature evaporator stage 17 of adjacent evaporator 15 for recooling of the refrigerant. Bleed passage 97 is provided to pass a small quantity of the returning liquid refrigerant into liquid condensate header 67.

A refrigerant reconcentration and vapor pressure control passage 100 extends between sumps 85 and 52 as shown in the drawing. This passage serves to adjust the concentration and vapor pressure of refrigerant and absorbent solution in the system under various operating conditions as will be explained subsequently.

A heating passage 105 communicates with passage 95 at a point below the top of upwardly arched loop 96. A mode control valve 107 is disposed in passage 105 which communicates at its other end with generator 10 through passage 57. Another heating passage 110 having a mode control valve 111 therein communicates between discharge of solution passage 30 and absorbent sump 52. A third heating passage 115 has an upper end connected between upwardly arched portion 61 and downwardly arched portion 62 of passage 60. Passage 115 has a downwardly extending loop 116 and an upwardly extending loop 117 therein. The downward leg 118 of upwardly extending loop 117 is connected to refrigerant sump 85 and is of larger diameter than the legs of loop 116 to prevent siphoning of loop 116.

BASIC COOLING MODE OPERATION

When the system is in the cooling mode of operation, mode control valves 107 and 111 are closed and the liquid levels are approximately as shown in the drawing. Loop 116 is filled with sufficient liquid to balance the pressure difference between generator 10 and refrigerant sump 85 to prevent passage of vapor therebetween. During operation, strong arbsobent solution from generator 10 serially passes through tubes 34 and 43 of absorber stages 13 and 14 absorbing refrigerant vapor generated in adiabatic evaporator stages 16 and 17 respectively. Weak absorbent solution is returned from absorber 15 via weak solution sump 52 by weak solution pump 54 to generator 10 for reconcentration. A low vapor pressure is maintained in absorber stages 13 and 14 by rejecting the heat of the absorption process into air passing over the exterior of the absorber tubes. Refrigerant condensate from condenser 11 and warm liquid refrigerant from heat exchanger 18 are passed first through a high temperature evaporator stage 17 and then through low temperature evaporator stage 16 to adibatically flash-cool the refrigerant. The cold refrigerant is circulated by pump 87 through heat exchanger 18 to cool air passing through duct 93. At or above design ambient absorber temperature, the refrigerant circulated through evaporator 15 and heat exchanger 18 is preferably substantially pure water and the strong absorbent solution concentration is preferably about 64.5% lithium bromide by weight.

HEATING MODE OPERATION

To switch from the cooling mode of operation to the heating mode, control valves 107 and 111 are opened. Operation of pumps 54 and 29, and fans 36 and 45, is discontinued. Opening of valve 107 causes the fluid passing through passage 95 from heat exchanger 18 to be diverted into passage 105 because passage 105 and connecting passage 57 is below the top of loop 96 which is above the top of loop 61. Generator 10 and loops 61 and 62 are flooded with a mixture of refrigerant and absorbent solution by pump 87. The liquid level in passage 60 is below the junction of vent line 63 and below the top of loop 96.

It is preferred that all of the refrigerant and absorbent solution in the system be mixed together to form weak heating solution when the system is in the heating mode. The preferred range of concentration is between about fifty percent and about thirty percent lithium bromide, having a solidification temperature below about $-40°$ F., which is substantially lower than that of pure refrigerant ($32°$ F.) or strong 64.5% solution ($110°$ F.), thereby effectively preventing freezing damage to the system at any normally incurred ambient temperatures. If freezing protection to only $0°$ F. is required, the concentration of the solution may range between about 20% to about 55% lithium bromide. Further freezing protection is afforded because the preferred mixtures contract upon solidifying so that damage to the system is rendered unlikely.

The solution is preferably heated in generator 10 to about $125°$ F. which is sufficient to provide winter heating from heat exchanger 18 having a size which is designed to accommodate the refrigeration capacity of the system. The preferred temperature however is below the temperature at which the solution in the generator will boil, because of the liquid head imposed on the generator by loop 61. The solution in loop 61 is relatively cooler than that in the generator because of heat exchange with ambient atmosphere which inhibits boiling or vaporization in the loop.

A major portion of the heated solution (90%) passes upwardly through loop 61 into heating passage 115. The level of the heated solution is above the level of upwardly extending loop 117 and it will flow by gravity through passage 115 through downwardly extending leg 118 into refrigerant sump 85. The heated solution passes from refrigerant sump 85 through passage 86 and is pumped by pump 87 via passage 88 through the heat exchanger 18. Heat exchanger 18 in the heating mode operation operates as a heat rejecting exchanger, thereby warming air passing through duct 93 and cooling the solution. The cooled solution passes from heat exchanger 18 through passages 95, 105 and 57 back to generator 10 for reheating. A minor portion (10%) of the solution heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

It will be seen that in the heating mode of operation, most of the locations in the system at which a substantial quantity of refrigerant accumulates are flushed out by heating solution or can be drained to minimize the likelihood of damage to the system by freezing at low ambient temperatures. At the same time, however, passage of solution through the condenser, evaporator and absorber is terminated in order to prevent loss of heat at these locations.

TRANSITION FROM HEATING TO COOLING MODE OPERATION

When it is desired to terminate heating and return to the cooling mode of operation, mode control valves 107 and 111 are closed. Pumps 54 and 29, and fans 36 and 45 are again energized. Closing of valve 107 terminates direct flow of solution from heat exchanger 18 to generator 10. Instead, solution is pumped from heat exchanger 18, through upwardly extending loop 96 and passage 95, and serially through high temperature evaporator 17 and low temperature evaporator 16 of adiabatic evaporator 15. The solution in generator 10 is heated to the boiling temperature to concentrate the solution. The level of solution in the generator drops so that vapor passage 60 is free of liquid and loop 116 is sealed but no longer passes solution.

Vapor formed in generator 10 is condensed in condenser 11 and passes through refrigerant liquid passage 68 into high temperature evaporator section 17 and thence into low temperature evaporator section 16. The condenate then passes through passage 84 into refrigerant sump 85 from which it is pumped by pump 87 through heat exchanger 18.

In time, if the ambient absorber temperature is above the design condition, the concentration of refrigerant in the fluid pumped through heat exchanger 18 will increase due to the addition of pure refrigerant condensate from condenser 11.

Strong absorbent solution formed in generator 10 will pass through passage 28, heat exchanger 19 and passages 28 and 30 to absorber 12. From there, the absorbent solution will pass serially through low pressure absorber stage 13 and high pressure absorber stage 14 into absorbent sump 52 and be returned to generator 10 by pump 54 where it will be concentrated. Thus, at absorber ambient temperatures above the design temperature, the absorbent solution circulating in the system will increase in absorbent concentration as the absorbent solution is concentrated by boiling in the generator.

The volume of strong absorbent solution passing to sump 52 will decrease as refrigerant is boiled from it in the generator, and the level of solution in sump 52 will tend to drop. Conversely, the quantity of refrigerant passing through evaporator 15 will increase due to the refrigerant added to the refrigerant circuit from condenser 11, and the level of refrigerant in sump 85 will tend to rise. When the level of refrigerant in sump 85 tends to exceed the level of absorbent solution in sump 52, some refrigerant, contaminated with absorbent solution from the heating mode of operation, will flow through refrigerant reconcentration and vapor pressure control passage 100 into absorbent sump 52 to balance the liquid levels in the two sumps. The vertical elevations of sumps 85 and 52 are arranged so that the solution levels in the two sumps are the same as each other and that of passage 100 when sump 85 contains virtually pure refrigerant and sump 52 contains strong solution concentrated to the maximum design operating condition concentration.

At ambient absorber temperature above design conditions, absorbent contaminated refrigerant will continue to be bled from sump 85 into sump 52 until the refrigerant has been substantially concentrated and the absorbent solution has been concentrated to the desired full-load design operating concentration.

As the two concentrations increase by separation of absorbent and refrigerant from each other, increased refrigeration capacity can be obtained from the system. Eventually, full refrigeration capacity is reached at high ambient absorber temperature when the refrigerant and absorbent solution are fully concentrated. While only partial refrigeration capacity is achieved in the interim period, under practical conditions, full capacity is not needed just after the system has experienced a demand for heating. Consequently, the system is able to handle normal demands for both heating and cooling to provide satisfactory air conditioning throughout the entire year.

COOLING MODE OPERATION AT LOW AMBIENT TEMPERATURE

It has been seen that the system when switching from heating to cooling at ambient absorber temperatures above design operating conditions, will completely separate the absorbent solution from the refrigerant. Often, however, the refrigeration system is called upon to operate at relatively low ambient temperatures which are below the predetermined design absorber ambient temperature, which may be about 95° F. This is particularly true during spring and fall where a need to switch from heating to cooling and back again would be most probably encountered.

If the ambient temperature of air passed over absorber 12 is less than the design temperature, the process of concentrating the absorbent solution and the refrigerant will stop at some intermediate concentration where an equilibrium is reached between absorber capacity and refrigeration demand. From then on, the concentration of absorbent and refrigerant will adjust itself to provide a variable vapor pressure effect which just balances refrigeration load against absorber capacity.

To explain how this variable vapor pressure and variable refrigerant concentration effect works, assume that the refrigeration system is operating at an ambient temperature slightly above the design temperature at which the refrigerant and absorbent solution are fully concentrated. If the ambient absorber temperature drops, the temperature of the absorbent solution passing through absorber tubes 34 and 43 will also drop. The decreased temperature of the absorbent solution will result in a decreased absorber vapor pressure and therefore the capacity of the absorber to absorb water vapor will increase. Consequently, the quantity of water vapor evaporated in evaporators 16 and 17 will begin to increase in order to satisfy the increased absorber capacity. This greater quantity of water vapor being absorbed in the absorber will reduce the final concentration of weak absorbent solution leaving absorber 12 through passage 51. Therefore, the volume of solution discharge from line 51 into absorbent sump 52 will increase because of the additional refrigerant absorbed in the solution. The increased volume of weak solution tends to cause the level of the absorbent solution to rise in sump 52. Also, the volume of refrigerant discharged into refrigerant sump 85 is decreased due to the greater quantity of refrigerant evaporated. This tends to decrease the refrigerant level in refrigerant sump 85. As the level of weak solution in sump 52 tends to increase above the level of refrigerant in sump 85, absorbent solution will begin to flow from sump 52 through vapor pressure control passage 100 into the refrigerant sump 85 to balance the liquid levels in sumps 52 and 85.

The passage of absorbent solution from absorbent sump 52 to refrigerant sump 85 will continue until the level of the liquids in the two sumps balance each other for the rate at which the sumps are receiving liquid. This passage of absorbent solution into the refrigerant sump will contaminate or dilute the refrigerant being circulated through heat exchanger 18 to evaporator 15 with absorbent salt. The dilution of refrigerant with the absorbent solution decreases its vapor pressure and increases the evaporation temperature of refrigerant in the adiabatic evaporator stages. Both the refrigerant and absorbent solution continue to be diluted until the evaporation temperature in the evaporator stages 16 and 17 rises back to the desired design evaporator temperature at which the refrigeration load just balances the absorber capacity. Bleed passage 97 prevents flash-freezing of refrigerant condensate in passage 68 by diluting the refrigerant with absorbent contaminated refrigerant from passage 95.

If the ambient absorber temperature rises, the refrigerant and absorbent concentrations will increase to balance each other at the new absorber ambient temperature. The increased absorber temperature reduces the ability of absorber 12 to absorb refrigerant vapor. Thus, the volume of solution passing into weak solution sump 52 decreases due to the weak solution having absorbed less refrigerant vapor. Also, the quantity of refrigerant discharged into refrigerant sump 85 increases due to less refrigerant having been evaporated in evaporator 15. Consequently, the level of solution in sump 52 tends to drop below the level of refrigerant in sump 85 and some of the diluted refrigerant is bled into the absorbent circuit through vapor pressure control passage 100. The refrigerant-rich solution bled through passage 100 passes to generator 10 via lines 55 and 57, and the refrigerant is boiled off and condensed in refrigerant condenser 11. Pure refrigerant condensate from condenser 11 is collected in header 67 and passes through refrigerant condensate line 68 back to evaporator 15. Concentrated absorbent solution is passed back to the absorbent circuit. Eventually, by bleeding diluted refrigerant from sump 85 into absorbent sump 52, the system will concentrate both the absorbent and the refrigerant until the refrigeration load and absorber capacity balance each other or until the refrigerant is concentrated to substantially pure water.

Figure 2:
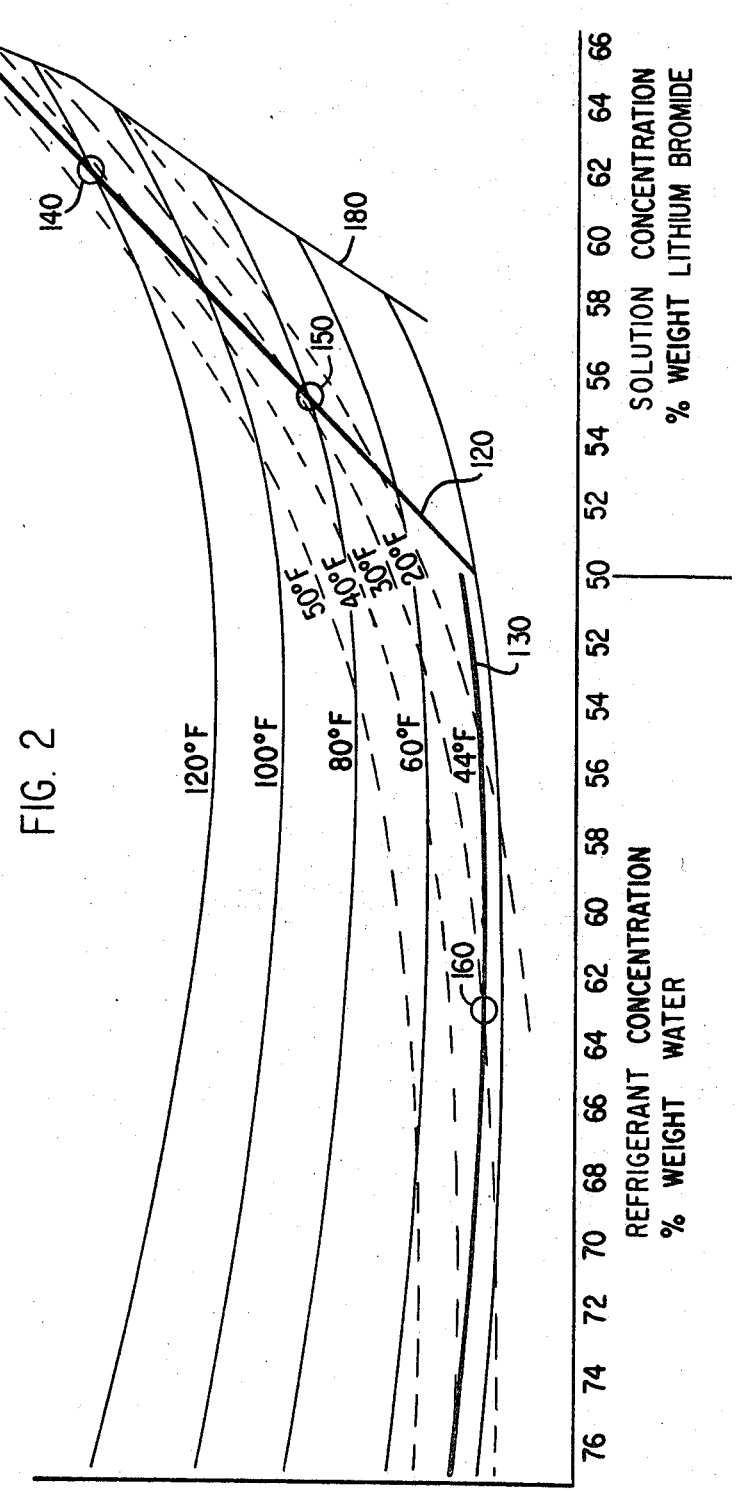
FIG. 2 depicts solution concentration, refrigerant concentration and temperature conditions of operation of the illustrated system on an enthalpy-concentration diagram for a lithium bromide-water system.

FIG. 2 illustrates the operating characteristics of an absorption refrigeration system, employing the controlled vapor pressure principle of this invention on a lithium bromide-water, enthalpy-concentration diagram for a system having an approximately 50 percent minimum solution concentration. The dashed lines represent absorber vapor pressure as dew point in degrees Fahrenheit and the solid lines represent absorber solution temperature in degrees Fahrenheit. The horizontal axis represents absorbent solution concentration in percent or a refrigerant concentration which is one hundred minus the absorbent concentration.

Line 120 represents the average solution concentration of absorbent solution throughout absorber 12. Line 130 represents the average concentration of refrigerant throughout evaporator 15. At the design condition for the system, represented by point 140, 95° F. ambient air will provide an absorbent solution temperature of about 120° F. in absorber 12 for a 25° F. temperature difference. The strong solution concentration leaving the generator under these conditions is about 64.5 percent lithium bromide by weight, but the average solution concentration in the absorber will be approximately 62.5 percent lithium bromide by weight. Under these conditions, the absorber vapor pressure will be equivalent to that of about 44° chilled water, and the refrigerant concentration will be about 100 percent water (0 percent lithium bromide).

If the ambient air temperature decreases from 95° to 55°, the temperature of the absorbent solution in the absorber will be about 80° assuming a 25° loss; this condition of operation is illustrated by point 150. Under these conditions, the average concentration of absorbent solution in absorber 12 will be about 55 percent lithium bromide, and the absorber vapor pressure will be equivalent to about a 30° F. chilled water temperature. By following the 30° F. dew point line down to the point where it intersects line 130, it will be seen that the refrigerant concentration in evaporator 15 will be about 63 percent water (37 percent lithium bromide) as represented by point 160. It will be noted that the chilled water temperature of 44° F. is maintained even though the dew point in the absorber is at or below the freezing temperature of pure water, where conventional absorption refrigeration systems would not be able to provide refrigeration.

Line 180 depicts the crystallization line for lithium bromide. It will be observed that as the ambient absorber temperature drops, the average solution concentration of absorbent in absorber 12 actually recedes away from the crystallization line in contrast to prior systems wherein absorbent crystallization is a problem, when the ambient absorber temperature drops. Consequently, the variable vapor pressure-variable concentration system described is able to operate satisfactorily with uncontrolled ambient condenser and absorber temperatures.

Thus, at relatively low ambient temperatures, i.e. below the design temperature, the vapor pressure of the refrigerant and the vapor pressure of the absorbent solution automatically and continuously adjust themselves to the refrigeration load and to the ambient absorber temperature to provide the desired refrigeration capacity at the desired chilled water temperature. In a system according to this invention, the refrigerant is always automatically diluted with absorbent solution at relatively low ambient absorber temperatures to an extent that will provide an approximately uniform evaporator temperature or refrigerant boiling point regardless of changes in ambient absorbent temperature which would normally result in changing the evaporator temperature.

While the invention has been described with respect to an air conditioning system employing a fan-coil heat exchanger for absorption and rejection of heat in the cooling and heating modes respectively, the invention is also applicable to water chillers and other types of refrigeration-heating systems. Heat exchanger 18 may comprise a heat exchanger disposed in a non-adiabatic evaporator. Separate heat rejecting and heat absorbing heat exchangers may be employed if desired. Refrigerant sump 85 may be made integral with evaporator 15 and solution sump 52 may be combined with absorber 12.

It is preferred that vapor pressure control passage 100 automatically operates to balance the liquid heads in refrigerant sump 85 and solution sump 52, as illustrated in the drawing. This arrangement automatically dilutes the refrigerant with absorbent solution, when the quantity of absorbent solution leaving the absorber exceeds the quantity of refrigerant leaving the evaporator, which occurs when the absorbent solution is diluted by increased absorption of refrigerant. Likewise, vapor pressure control passage 100 automatically increases the concentration of refrigerant, by passing dilute refrigerant into weak solution passages 53, 55, 57 to the generator for separation from the absorbent, when the quantity of refrigerant leaving the evaporator exceeds the quantity of absorbent discharged from the absorber. However, vapor pressure control passage 100 may alternatively comprise separate passages for performing the functions described. It will also be appreciated that it is not necessary for the vapor pressure control passage to extend between refrigerant and absorbent sumps as illustrated in the preferred embodiment. The vapor pressure control passage may comprise any passage between a suitable location containing absorbent solution and a location in communication with the evaporator, together with either the same or another passage between some location containing refrigerant which is in communication with the generator. The passages may have valve means associated with them which are provided with a suitable control system for adjusting the concentration of refrigerant and absorbent in accordance with a suitable operating condition of the system or directly in response to ambient absorber or condenser temperature.

It is not necessary to provide a heating system as illustrated in the preferred embodiment. However, the variable vapor pressure system described is particularly advantageous when used in conjunction with a heating system because it provides a means for obtaining partial refrigeration capacity while automatically separating mixed solution and refrigerant upon switching from heating to the cooling mode of operation. By changing the composition of refrigerant in the evaporator and the absorbent in the absorber so as to vary its vapor pressure as described herein, it is possible to operate an absorption refrigeration system with varying absorber and/or condenser ambient temperatures. It will be understood that either or both the absorber and condenser may be cooled by a cooling medium, such as cooling tower water, and that it is not necessary to maintain a controlled minimum cooling water temperature to prevent solidification of absorbent or freezing of refrigerant because of the automatic dilution feature of this invention. For example, the system may operate with an air-cooled absorber and condenser at ambient temperatures as low as about 35° F. and still provide cooling because both the refrigerant and the absorbent solution are automatically diluted to form a mixture having a low freezing temperature relative to either strong 64.5% solution or pure water. This also permits the system to be located out of doors in a low temperature ambient environment.

Another important advantage of the arrangement described herein is that solidification of absorbent solution at above design absorber ambient temperatures is overcome by automatically diluting the absorbent with refrigerant. When the absorber ambient temperature rises above design or in the event that the absorber capacity is reduced by improper purging, the refrigerant level will begin to rise in the refrigerant sump and will overflow into the absorbent sump, thereby diluting the highly concentrated absorbent and preventing it from solidifying.

The efficiency of a system in accordance with this invention is materially improved at off design low ambient conditions, because the system rejects heat at a lower temperature than when controlled absorber or condenser temperature is required.

While a preferred embodiment of the invention has been described for purposes of illustration, it will be appreciated that the invention may be otherwise embodied within the scope of the following claims.

I claim:
1. An absorption refrigeration system comprising:
   (A) a generator for boiling absorbent solution to concentrate said solution;
   (B) a condenser for condensing refrigerant vapor formed in said generator;
   (C) an evaporator for evaporating refrigerant condensed in said condenser to provide cooling;
   (D) an absorber for absorbing refrigerant vapor formed in said evaporator into absorbent solution concentrated in said generator; and
   (E) refrigerant vapor pressure control means operable when said system is providing cooling for controlling and maintaining substantially constant the vapor pressure of the refrigerant in said evaporator by varying the composition of the refrigerant in the evaporator during operation of the system, said refrigerant vapor pressure control means including a refrigerant sump for collecting refrigerant liquid, an absorbent sump for collecting absorbent solution, and refrigerant vapor pressure passage control means connected to said absorbent sump at a predetermined level therein and extending to said refrigerant sump for passing absorbent solution from said absorbent sump into said refrigerant sump when the level of absorbent solution in said absorbent sump exceeds said predetermined level due to a decrease in ambient temperature during operation of the system to lower the vapor pressure of the refrigerant sufficiently to maintain substantially the same evaporator temperature at the decreased ambient absorber temperature.

2. An absorption refrigeration system as defined in claim 1 wherein said vapor pressure control means comprises passage means for passing diluted refrigerant to said generator for separation and return of concentrated refrigerant to a location in said system effective for concentrating the refrigerant to thereby increase the vapor pressure and reduce the boiling point of the refrigerant in said evaporator at another condition of operation of said system.

3. An absorption refrigeration system as defined in claim 1 including:

said vapor pressure control means comprising a liquid passage extending between said refrigerant sump and said absorbent sump for passing liquid from either one of said sumps to the other sump by gravity, said vapor pressure control passage being effective to balance the liquid levels in said sumps during periods of operation at low ambient absorber temperatures.

4. An absorption refrigeration system as defined in claim 1 including:
   (A) said evaporator comprising an adiabatic evaporator for evaporating a portion of the refrigerant to cool the remaining portion of liquid refrigerant therein;
   (B) refrigerant passage means for passing cooled liquid refrigerant from said evaporator to a heat absorbing heat exchanger for passing said cooled refrigerant liquid in heat exchange relation with a refrigeration load;
   (C) refrigerant passage means for returning liquid refrigerant from said heat absorbing heat exchanger to said evaporator for cooling therein;
   (D) said vapor pressure control means comprising passage means for diluting the refrigerant passing to said evaporator from said heat absorbing heat exchanger with absorbent solution to reduce the vapor of the liquid refrigerant in said evaporator at a predetermined condition of operation of said system.

5. An absorption refrigeration system as defined in claim 1 including:
   (A) said evaporator comprising an adiabatic evaporator for evaporating a portion of the refrigerant to cool the remaining portion of liquid refrigerant therein;
   (B) refrigerant passage means for passing cooled liquid refrigerant from said evaporator to a heat absorbing heat exchanger for passing said cooled refrigerant liquid in heat exchange relation with a refrigeration load;
   (C) refrigerant passage means for returning liquid refrigerant from said heat absorbing heat exchanger to said evaporator for cooling therein;
   (D) absorbent passage means for passing absorbent solution from said absorber to said generator; and
   (E) said vapor pressure control means comprising passage means communicating with said refrigerant passage means and said absorbent passage means.

6. An absorption refrigeration system as defined in claim 1 including means for passing air in heat exchange relation with absorbent solution in said absorber and in heat exchange relation with refrigerant in said condenser.

7. An absorption refrigeration system as defined in claim 1 wherein the absorbent solution comprises an aqueous solution of a lithium halide and said refrigerant comprises water.

8. An absorption refrigeration system as defined in claim 1 including:
   (A) means for passing air in heat exchange relation with absorbent solution in said absorber and in heat exchange relation with refrigerant in said condenser;
   (B) the absorbent solution comprising an aqueous solution of lithium bromide; and
   (C) the refrigerant comprising water.

9. A method of operating an absorption refrigeration system to provide cooling, said system having a generator, a condenser, an evaporator and an absorber; wherein said method comprises:
   (A) boiling weak absorbent solution in the generator to concentrate the solution and form refrigerant vapor;
   (B) condensing refrigerant vapor in the condenser which was formed in the generator, to form liquid refrigerant;
   (C) evaporating liquid refrigerant in the evaporator which was formed in the condenser to provide cooling;

(D) absorbing refrigerant vapor in the absorber which was formed in the evaporator into strong absorbent solution formed in the generator;

wherein the improvement comprises:

(E) controlling the vapor pressure of the refrigerant in the evaporator by continuously varying the composition of the refrigerant therein during operation of the system at low ambient absorber temperatures in response to changes in ambient absorber temperature to vary the evaporator vapor pressure sufficiently to maintain a substantially constant evaporator temperature during variations in ambient absorber temperature.

10. A method of operating an absorption refrigeration system as defined in claim 9 wherein the step of controlling the vapor pressure of refrigerant in the evaporator comprises diluting of the refrigerant with a substance which serves to lower the vapor pressure of the refrigerant when combined therewith.

11. A method of operating an absorption refrigeration system as defined in claim 9 wherein the step of controlling the vapor pressure of the refrigerant in the evaporator by varying the composition of the refrigerant therein comprises varying the amount of absorbent in the refrigerant in said evaporator.

12. A method of operating an absorption refrigeration system as defined in claim 9 wherein the step of controlling the vapor pressure of refrigerant in said system includes the steps of:

(A) collecting absorbent solution leaving the absorber in an absorbent sump;

(B) collecting refrigerant leaving the evaporator in a refrigerant sump;

(C) passing absorbent solution from the absorbent sump to the evaporator to dilute the refrigerant in the evaporator and to vary the vapor pressure thereof when the volume of absorbent solution in the absorbent sump exceeds a predetermined quantity; and (D) passing diluted refrigerant from the refrigerant sump into the absorbent solution when the volume of diluted refrigerant in the refrigerant sump exceeds a predetermined quantity.

13. A method of operating an absorption refrigeration system as defined in claim 9, wherein the steps of controlling the vapor pressure of the refrigerant includes the steps of:

(A) diluting the refrigerant in the evaporator with absorbent solution upon a drop in ambient absorber temperature below a predetermined temperature; and (B) concentrating the refrigerant in the evaporator by passing diluted refrigerant to the generator for separation of refrigerant from absorbent upon a rise in ambient absorber temperature toward said predetermined temperature.

14. A method of operating an absorption refrigeration system as defined in claim 9 wherein the method of controlling the vapor pressure of refrigerant in said system includes the steps of:

(A) diluting the refrigerant in the evaporator with absorbent solution and diluting the absorbent solution in the absorber with refrigerant upon a drop in ambient absorber temperature below a predetermined temperature; and (B) concentrating the refrigerant in the evaporator and concentrating the absorbent in the absorber upon a rise in ambient absorber temperature toward said predetermined temperature.

15. A method of operating an absorption refrigeration system as defined in claim 9 wherein said step of controlling the vapor pressure of the refrigerant includes the steps of:

(A) collecting refrigerant liquid from the evaporator in a refrigerant sump;

(B) collecting absorbent solution from the absorber in an absorbent sump; and (C) balancing the level of liquid in the refrigerant sump with the head of liquid in the absorbent sump by passing liquid from either of said sumps to the other sump.

16. A method of operating an absorption refrigeration system as defined in claim 9 wherein the step of controlling the vapor pressure of the refrigerant in said system comprises passing absorbent solution from the absorber to the evaporator to reduce the vapor pressure of the refrigerant therein.

References Cited

UNITED STATES PATENTS

| | | | |
|---|---|---|---|
| 2,818,234 | 12/1957 | Berry | 165—62 |
| 3,124,938 | 3/1964 | Leonard, Jr. | 62—109X |
| 3,263,437 | 8/1966 | Aronson | 62—141X |
| 3,452,552 | 7/1969 | Johnson | 62—141 |

WILLIAM E. WAYNER, Primary Examiner

UNITED STATES PATENT OFFICE
CERTIFICATE OF CORRECTION

Patent No. 3,555,839    Dated January 19, 1971

Inventor(s) LOUIS H. LEONARD, JR.

It is certified that error appears in the above-identified patent and that said Letters Patent are hereby corrected as shown below:

Column 5, line 21, "adjacent" should read --adiabatic--

Column 5, line 67, "adibatically" should read --adiabatica

Column 7, line 15, "condenate" should read --condensate--

Signed and sealed this 28th day of March 1972.

(SEAL)
Attest:

EDWARD M. FLETCHER, JR.
Attesting Officer

ROBERT GOTTSCHALK
Commissioner of Patents